United States Patent [19]
Rizkovsky

[11] Patent Number: 5,613,321
[45] Date of Patent: Mar. 25, 1997

[54] RELEASABLE DRIVE MECHANISM

[75] Inventor: Roy R. Rizkovsky, Lake Elizabeth, Calif.

[73] Assignee: Ricon Corporation, Pacoima, Calif.

[21] Appl. No.: 298,438

[22] Filed: Aug. 30, 1994

[51] Int. Cl.⁶ .......................... E05F 15/00; F16D 11/04
[52] U.S. Cl. ...................... 49/139; 192/69.61; 192/97; 192/995; 192/108
[58] Field of Search ........................... 192/67 P, 108, 192/99 S, 97, 89.2, 89.27, 69.6, 69.61, 69.7; 74/625; 49/139, 140, 360

[56] References Cited

U.S. PATENT DOCUMENTS

| 4,265,350 | 5/1981 | Vaughan | 192/67 P X |
| 4,504,094 | 3/1985 | Barrows | 192/67 P X |
| 4,869,354 | 9/1989 | Brazier | 192/99 S X |
| 5,048,653 | 9/1991 | Fellows | 192/67 P |
| 5,161,630 | 11/1992 | Garin, III et al. | 192/67 P X |
| 5,263,527 | 11/1993 | Marlatt et al. | 160/7 |

FOREIGN PATENT DOCUMENTS 539229  7/1955  Belgium ................... 192/108

Primary Examiner—Richard M. Lorence
Attorney, Agent, or Firm—Darby & Darby, P.C.

[57] ABSTRACT

A releasable drive mechanism is provided, having a sprocket and gear rotatable about a central axis, the gear being rotatably secured to a shaft extending along the central axis. The sprocket and the gear are each configured to provide a coplanar portion extending parallel with the central axis that interfaces the surface of the other. A clutch engageable with the sprocket and the gear is provided, having projections or keys being positionable between the interfacing surfaces for releasably coupling the sprocket and the gear for joint rotation. A lever is provided for disengaging the clutch and the clutch may be biased to facilitate engagement of the clutch. A clip may also be provided to prevent lateral movement of the sprocket on the shaft when the clutch is disengaged.

9 Claims, 3 Drawing Sheets

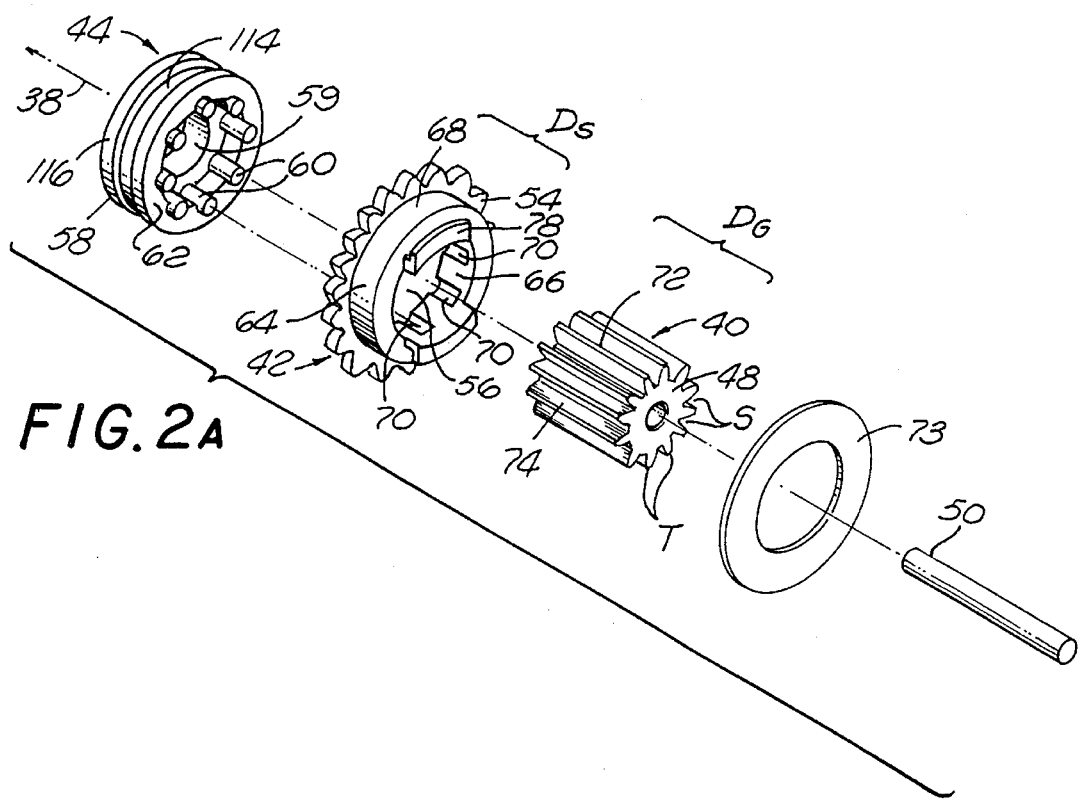
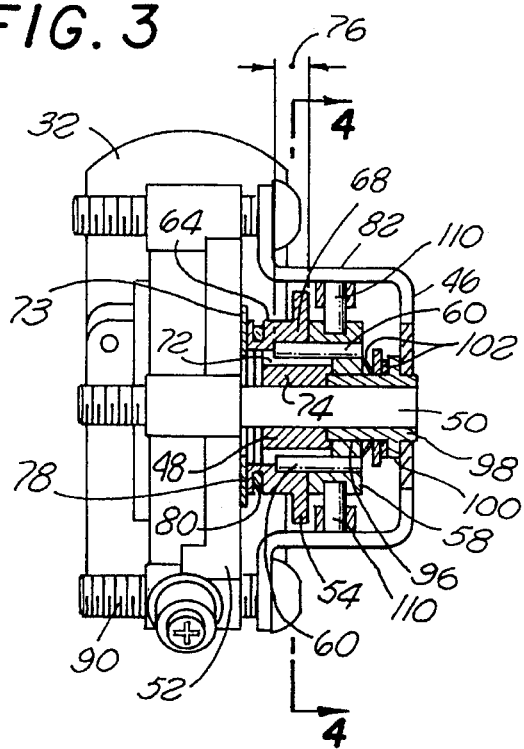

RELEASABLE DRIVE MECHANISM

FIELD OF THE INVENTION

This invention relates generally to releasable drive mechanisms, in particular, to releasable drive mechanisms employing a tensile member, such as a chain.

BACKGROUND AND SUMMARY OF THE INVENTION

Drive mechanisms employing gears and sprockets are well known. Such mechanisms have been used for operating garage doors, fire doors and more recently, for operating vehicle doors, especially, power sliding vehicle doors. Typically, a power sliding door unit incorporates a motor driving various coupled mechanisms such as a gear and sprocket arrangement to drive a chain for opening and closing the door. The chain may be secured at its two ends to opposing edges of the sliding door by a tension device, such as a spring, and a fastener, such as a pin.

Where the power sliding door unit and coupled mechanisms are operating properly, a user may simply open and close the sliding door by selectively controlling the motor driving the gear and sprocket. Where power fails or the unit otherwise becomes inoperative, the sliding door may nevertheless be manually opened or closed upon removal of the pin for detaching the chain from the door. However, once the chain has been detached, it may become entangled, rendering the task of reattaching the chain to the door difficult and cumbersome.

Release mechanisms for uncoupling chain-driven mechanisms are known. For example, U.S. Pat. No. 5,263,527 issued to Marlatt, et al., discloses a release mechanism including a pair of levers engaging a bearing disc to hold a toothed clutch in engagement between a shaft of a fire door and a shaft of its operator. Also, U.S. Pat. No. 5,048,653 issued to Fellows discloses a release apparatus for selectively connecting and disconnecting a sprocket drive wheel from a drive shaft by selectively thrusting a pair of sprag pins through registering openings in the sprocket wheel and into peripheral recesses in a collar secured to the drive shaft. These devices are often bulky and complex in structure. Moreover, where cooperating members are coupled by devices, such as pins, for joint rotation, the devices are often subjected to substantial deflection force and shear stress which break or otherwise deform the devices, shortening their life span.

Accordingly, there exists a demand for a simple, compact, yet sturdy, releasable drive mechanism, including a releasable drive mechanism for power sliding doors of vehicles, such as vans, buses, and the like. It is desired that such a releasable drive mechanism couple cooperating members in a manner minimizing wear and tear. It is also desired that such a releasable drive mechanism facilitates uncoupling as well as recoupling the cooperating members when desired.

In accordance with the present invention, a releasable drive mechanism is provided, having two cooperating members rotatable about a central axis, one of the cooperating members being rotatably secured to a shaft extending along the central axis, each of the cooperating members configured to provide at least a surface having a component or dimension parallel with the central axis that interfaces the surface of the other cooperating member, and a coupling member engageable with the cooperating members, the coupling member providing projections being positionable between the interfacing surfaces and movable relative to at least one of the interfacing surfaces for releasably coupling the cooperating members for joint rotation on the shaft. A means for disengaging the coupling member may also be provided. A biasing means may be further provided to facilitate engagement of the coupling member with the cooperating members.

These, as well as other features of the invention, will become apparent from the detailed description which follows, considered together with the appended drawings.

DESCRIPTIONS OF THE DRAWINGS

In the drawings, which constitute a part of this specification, exemplary embodiments demonstrating various features of the invention are set forth as follows:

FIG. 2A is an exploded view of selected components of FIG. 2;

FIG. 3 is a cross section of the embodiment of the invention of FIG. 1;

FIG. 4 is a partial view of the embodiment of FIG. 3, taken alone line 4—4;

FIG. 5 is an isometric view of a member of the invention;

DESCRIPTION OF THE ILLUSTRATIVE EMBODIMENTS

As indicated above, detailed illustrative embodiments are disclosed herein. However, structures for accomplishing the objectives of the present invention may be detailed quite differently from the disclosed embodiments. Consequently, specific structural and functional details disclosed herein are merely representative; yet, in that regard, they are deemed to afford the best embodiments for purposes of disclosure and to provide a basis for the claims herein which define the scope of the present invention.

Figure 1:
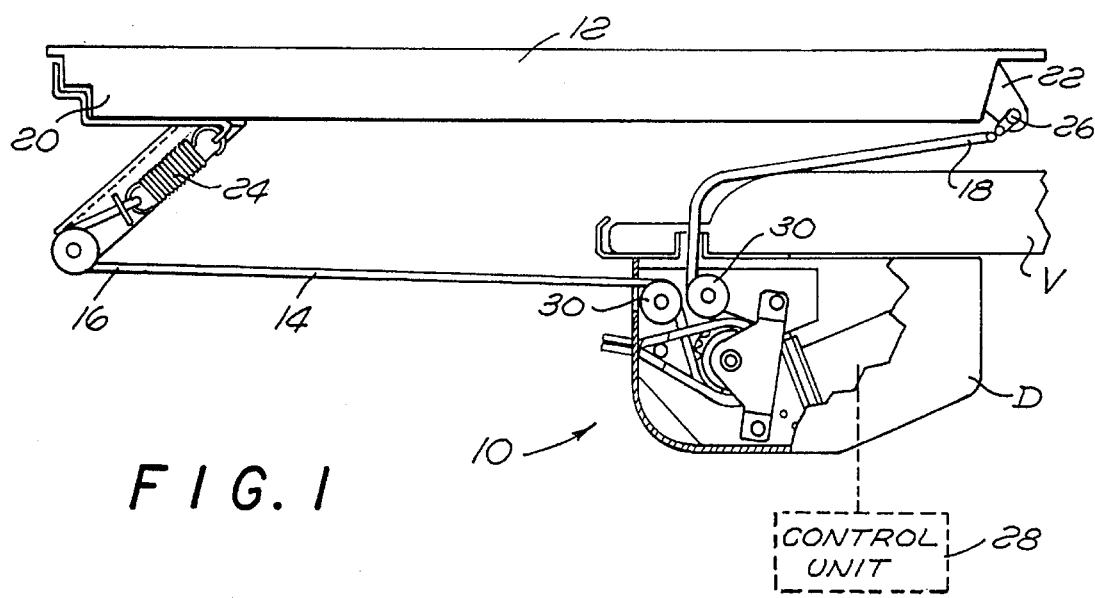
FIG. 1 is a plan view illustrating an embodiment of the invention for use with a power-driven sliding door of a vehicle.

Referring to FIG. 1, a releasable drive mechanism 10 is provided for use with a power-driven sliding door 12 of a vehicle V. As shown, the mechanism 10, which may be covered by a cover C for protection and aesthetics, is mounted on the vehicle V adjacent the door 12 to drive a chain 14 for opening and closing the door 12. The chain 14 has ends 16 and 18 connected to a front edge portion 20 and a rear edge portion 22 of the door 12. A tension device such as a spring 24 may be employed at the end 16 of the chain 14 to secure the end 16 to the front edge portion 20, while maintaining tension in the chain 14. A bolt, screw or pin 26 may be employed at the end 18 of the chain 14 to secure the end 18 to the rear edge portion 22 of the door 12.

As known in the art, an operator may use a control unit 28 to activate the mechanism 10 for opening and closing the door 12. Typically, in response to the control unit 28, the mechanism 10 moves the chain 14 so as to the draw the door 12 in one of two directions. To that end, guide supports such as rollers 30 may be provided adjacent the mechanism 10 to facilitate movement of the chain 14.

Figure 2:
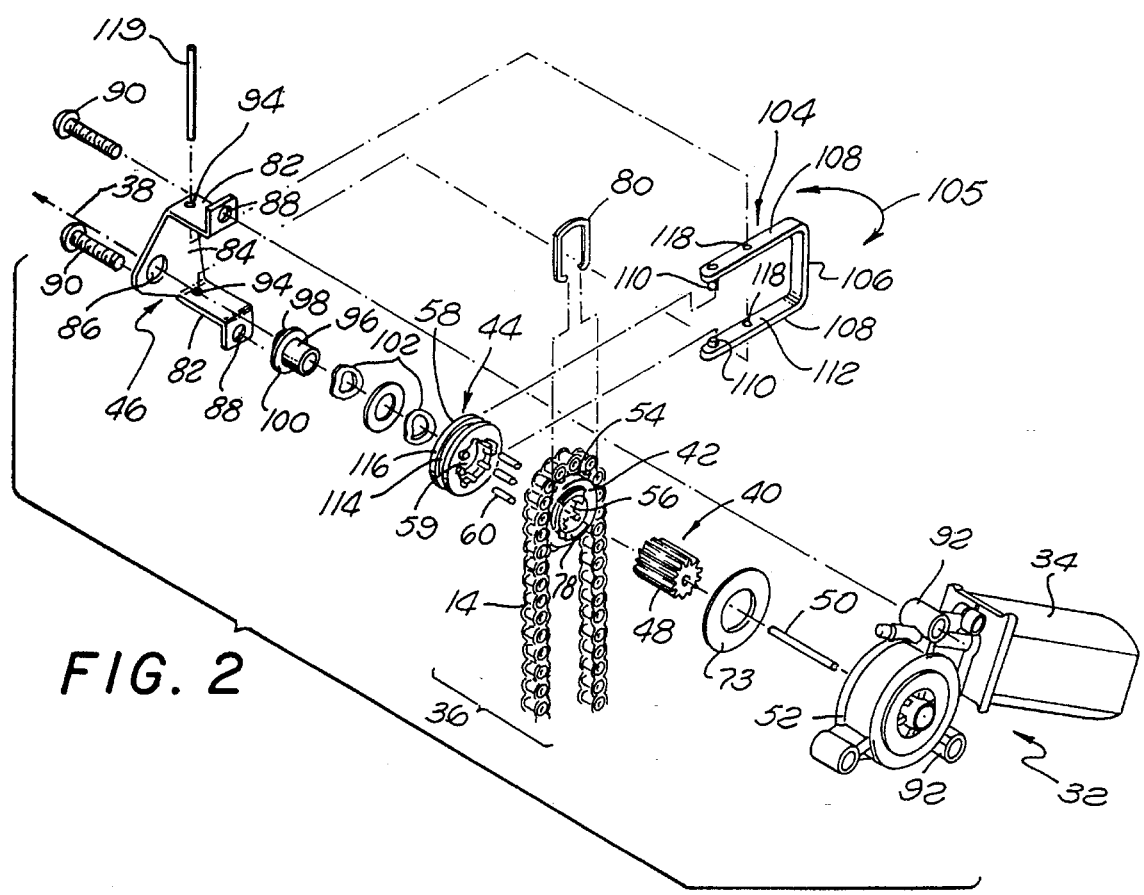
FIG. 2 is an exploded view of the embodiment of the invention of FIG. 1.

Referring to FIG. 2, the releasable drive mechanism 10 is shown, providing a motor unit 32 substantially enclosed in a housing 34. The motor unit 32 drives cooperating members 36 to jointly rotate about a central axis or an axial direction 38. The cooperating members 36 may include a driving member 40 and a driven member 42. A coupling member 44, engageable with the driving member 40 and the driven member 42, is provided to releasably couple the driving member 40 and the driven member 42 for joint rotation about the axis 38. A bracket member 46 is provided for retaining the coupling member 44 and the cooperating members 36 in the mechanism 10. As illustrated, the motor unit 32, the cooperating members 36, the coupling member 44 and the bracket member 46 are all positioned in coaxial alignment with respect to the central axis 38.

As will be described in further detail below, each of the cooperating members 36 of the present invention is configured to provide a surface extending parallel with the axial direction 38 which interfaces with the surface in the other cooperating member 36. Moreover, portions of the cooperating members 36 coinciding with the interfacing surfaces are substantially coplanar with each other. As such, an engagement zone is defined between the interfacing surfaces, and/or the coplanar portions, of the cooperating members 36 for joint rotation in a manner reducing various undesirable forces and shear stresses present in conventional gear and sprocket arrangements.

Referring also to FIG. 2A and 3 with FIG. 2, an embodiment of the present invention provides for a gear 48 (as a cooperating driving member 40), a sprocket 54 (as a cooperating driven member 42) on which the chain 14 is wound, and a clutch 58 (as the coupling member 44). The gear 48 is secured to a shaft 50 for joint rotation therewith, where the shaft 50 is driven to rotate by the motor unit 32. The shaft is mounted on a base 52 (FIG. 3) in the motor unit 32 and extends in the axial direction 38.

In the embodiment shown, the sprocket 54 is directly mounted on the gear 48 (see FIG. 3) such that the gear 48 sits in an enlarged circular opening 56 provided in the sprocket 54. For joint rotation on the shaft 50, the sprocket 54 and the gear 48 are releasably coupled by the clutch 58. The clutch 58 has an opening 59 aligned with the shaft 50 and is movable in the axial direction 38 toward or away from the sprocket 54 and the gear 48 to engage or disengage with same.

The clutch 58 provides a plurality of projections or keys 60 to facilitate joint rotation between the sprocket 54 and the gear 48. The keys 60 are substantially parallel with the axial direction 38 from a surface 62 facing the sprocket 54. Referring specifically to FIG. 5, the keys 60 may be substantially cylindrical, having a longitudinal plane P with length L and width W, and a circular cross-section C where the width W is the diameter.

In accordance with the present invention, the keys 60 may be inserted into an engagement zone E (see FIG. 4), defined generally by the gear 48 and the sprocket 54, by movement of the clutch 58 toward the sprocket 54 and the gear 48. Positioned in the engagement zone E when the clutch 58 is engaged, the keys 60 couple the gear 48 and the sprocket 54 for joint rotation on the shaft 50.

Further in accordance with the present invention, the gear 48 and the sprocket 54 are configured to extend parallel with the axial direction 38 for avoiding various undesirable forces and shear stresses present in conventional gear and sprocket arrangements. For example, the sprocket 54 is extended parallel with the axial direction 38 by providing a cylindrical portion 64 more clearly shown in FIGS. 2A and 3. In particular, the cylindrical portion 64 of the sprocket 54 provides a radially-inward facing surface 66 at the opening 56. The surface 66 has a component $D_s$ parallel with the axial direction 38 for defining an inner boundary $B_I$ (FIG. 4) of the engagement zone E. To accommodate the keys 60 when they are positioned in the engagement zone E, the surface 66 provides a plurality of recesses, e.g., keyways 70, configured for the keys 60. The length of the keyways 70 substantially extend the component $D_S$ parallel with the axial direction 38.

Similar to the sprocket 54, the gear 48 is also extended parallel with the axial direction 38 to provide a radially-outward surface or profile 72. The profile 72 has a component $D_G$ extending parallel with the axial direction 38 for defining an outer boundary $B_O$ (FIG. 4) of the engagement zone E. As the gear 48 provides teeth T, additional recesses are provided in spaces S between the teeth T, the spaces S being accommodating of the keys 60. The length of the teeth spaces S substantially extend the component $D_G$ parallel with the axial direction 38.

When the sprocket 54 is mounted on the gear 48 (see FIG. 3), the shaft 50 extends through both the gear 48 and the sprocket 54. More importantly, the inner surface 66 of the sprocket 54 substantially interfaces the profile 72 of the gear 48, and a portion 68 of the sprocket 54 coinciding with the surface 66 is substantially coplanar with or overlapping a portion 74 coinciding with the profile 72 of the gear 48 (see FIG. 3 at numeral 76). As viewed in the axial direction 38 (FIG. 4), the portion 68 of the sprocket 54 may circumscribe the portion 74 of the gear 48. Accordingly, the engagement zone E is bounded by the interfacing surface 66 and profile 72, and/or the coplanar portions 68 and 74. Moreover, the engagement zone E has a width 76 extending parallel with the axial direction 38.

With the sprocket 54 mounted on the gear 48, the keyways 70 and the teeth spaces S thereof are aligned by manual relative rotation between the sprocket 54 and the gear 48. Upon alignment between the keyways 70 and the teeth spaces S, the keys 60 may be readily inserted into the engagement zone E by movement of the clutch toward the sprocket 54 for coupling the sprocket 54 and the gear 48. So coupled, the sprocket 54 and the gear 48, with the clutch 58, are in locking engagement for joint rotation on the shaft 50.

As the sprocket 54 is most adjacent the base 52 when the clutch 58 is engaged, a washer 73 may be provided to reduce erosion and friction between the sprocket 54 and the base 52 when the sprocket 54 rotates.

Particularly noteworthy at this point are the extensions of the gear 48 and sprocket 54 parallel with the axis 38. As indicated, the interfacing surface 66 and profile 72, and/or the coplanar portions 68 and 74, substantially maximize utility of the keys 60. That is, by forming the engagement zone E having a width 76 extending parallel with the axis 38 for receiving the keys 60, the mechanism 10 releasably couples the sprocket 54 and gear 48 without generating substantial deflection forces caused by opposing torques in the gear 48 and the sprocket 54, which may otherwise break or bend the keys 60 through their lateral cross-sections C.

Moreover, where the sprocket 54 and the gear 48 may generate shear forces in the engagement zone E, potential damaging effects of the shear forces are minimized by positioning the keys 60 parallel with the central axis 38 in the engagement zone E. To that end, it is recognized that the effects of shear force may be reduced by increasing an area on which the shear force is exerted. That is, the greater the area, the lesser the shear stress. In the mechanism 10, the shear stress is reduced where the shear force is spread over a maximum area of the keys 60, that being the longitudinal plane P of the keys 60, rather than the smaller lateral circular cross-section C of the keys 60 of conventional gear and sprocket arrangements (see FIG. 5).

In view of the foregoing, it is appreciated that the axially parallel extensions of the sprocket 54 and the gear 48 extend the life span of the keys 60 by eliminating substantial deflection forces which may otherwise break the keys 60 and by substantially reducing the shear stress which may deform the keys 60. Thus, the releasable drive mechanism 10 minimizes wear and tear on the keys 60 while providing an overall simple, compact, yet sturdy, design.

As shown in FIG. 2, to substantially maintain alignment between the sprocket 54 and the gear 48, L-shaped flanges 78 are provided on the sprocket 54. In particular, the flanges 78 are provided on a surface on the sprocket 54 adjacent the motor unit 32 and normal to the central axis 38, for receiving a fastener, such as a C-clip 80, to secure the sprocket 54 to the shaft 50. As such, the flanges 78 and the C-clip 80 prevent the sprocket 54 from moving laterally on shaft 50 while enabling the sprocket 54 to jointly rotate with the gear 48. Where the clutch 58 is disengaged to uncouple the sprocket 54 and gear 48, the C-clip 80 prevents the sprocket 54 from slipping off the gear 48, particularly where the sprocket 54 may be moved about by the chain 14 as the door 12 is manually opened or closed.

To substantially maintain the overall alignment between the clutch 58, the sprocket 54 and the motor unit 32 along the central axis 38, the bracket member 46 is provided, having two arm portions 82 extending from a planar portion 84. The planar portion 84 is positioned substantially normal to the central axis 38 and configured for defining an opening 86 through which the central axis 38 extends. Bores 88 are provided in the ends of the arm portions 82 for receiving fasteners 90 affixing the bracket member 46 to supports 92 extending from the housing 34 of the motor unit 32. Provided in the arm portions 82 adjacent the planar portion 84 are additional bores 94, the significance of which is discussed further below.

As indicated, the clutch 58 is movable in the axial direction 38 toward or away from the sprocket 54 for respectively coupling or uncoupling the sprocket 54 and the opened or closed.

To substantially maintain the overall alignment between the clutch 58, the sprocket 54 and the motor unit 32 along the central axis 38, the bracket member 46 is provided, having two arm portions 82 extending from a planar portion 84. The planar portion 84 is positioned substantially normal to the central axis 38 and configured for defining an opening 86 through which the central axis 38 extends. Bores 88 are provided in the ends of the arm portions 82 for receiving fasteners 90 affixing the bracket member 46 to supports 92 extending from the housing 34 of the motor unit 32. Provided in the arm portions 82 adjacent the planar portion 84 are additional bores 94, the significance of which is discussed further below.

As indicated, the clutch 58 is movable in the axial direction 38 toward or away from the sprocket 54 for respectively coupling or uncoupling the sprocket 54 and the gear 48. To bias the clutch 58 toward the sprocket 54, a sleeve bearing 96 and various spring devices are provided. Aligned with the central axis 38, the sleeve bearing 96 is positioned between the planar portion 84 of the bracket member 46 and the clutch 58, an end 98 of the sleeve bearing 96 extending through the opening 86 of the bracket member 46. With a shoulder portion 100 abutting the planar portion 84 of the bracket member 46, the sleeve bearing 96 is inserted through the spring devices and the opening 59 of the clutch 58 to receive the shaft 50. The spring devices may be wave washers 102.

Accordingly, when the bracket member 46 is affixed to the support 92 of the housing 34, the planar portion 84 of the bracket member 46 presses on the shoulder portion 100 of the sleeve bearing 96 to facilitate engagement of the clutch 58. That is, the shoulder portion 100 of the sleeve bearing 96 urges the washers 102, which in turn urge the clutch 58 and the keys 60 toward the sprocket 54 and the gear 48. As indicated, once the keys 60 are positioned in the keyways 70 of the sprocket 54 and the teeth spaces S of the gear 48, the sprocket 54 and the gear 48, with the clutch 58, are in locking engagement for joint rotation on the shaft 50. Where power is available, the control unit 28 may be used to open and close the door 12.

However, where power fails, the clutch may be disengaged, uncoupling the sprocket 58 and the gear 48 to allow manual opening and closing of the door 12. To that end, the clutch 58 provides a lever 104 operable between two positions, namely, an engaged position, and a disengaged position (see FIG. 2, arrow 105), to move the clutch 58 toward or away from the sprocket 54, respectively.

The lever 104 provides a handle 106 with two legs 108 extending therefrom, substantially straddling the clutch 58. Tabs or nubs 110, are provided on inner surfaces 112 of the legs 108 to engage a groove or track 114 provided in an outer cylindrical surface 116 of the clutch 58. Thus, as the clutch 58 rotates about the central axis 38 when engaged with the sprocket 54 and gear 48, the lever 104 remains engaged with the clutch 58.

Bores 118 are provided in the ends of the legs 108 of the lever 104 to receive fasteners, e.g., a pin 199, inserted through the bores 94 of the bracket member 46 to render the lever 104 pivotable about the bores 94. Where the lever 104 is in the engaged position for coupling the sprocket 54 and the gear 48, the handle 106 extends substantially normally to the central axis 38, with the nubs 110 riding in the track 114 of the clutch 58.

To move the lever 104 to the disengaged position, the lever 104 may be pivoted about the bores 94 by pushing the handle 106 toward the bracket member 46, whereupon the nubs 110 push against the track 114 to move the clutch 58 away from the sprocket 54, against the bias of the wave washers 102. As such, the clutch 58 uncouples the sprocket 54 and gear 48, withdrawing the keys 60 from the keyways 70 and the teeth spaces S. Thereafter, the sprocket 54 may freely rotate about the gear 48 and the shaft 50 for enabling the chain 14 to move for manual opening and closing of the door 12.

To engage the clutch 58, as where power is again available for operating the control unit 28 or the motor unit 32, the lever 104 may be pivoted from the disengaged position back to the engaged position, whereupon the keys 60 reenter the engagement zone E between the sprocket 54 and the gear 48 to sit between the keyways 70 and the teeth spaces S. If the keyways 70 are not substantially aligned with the teeth spaces S, the sprocket 54 may be slightly manually rotated relative to the gear 48 such that upon alignment between the keyways and the teeth space, the keys 60 are readily inserted into position in the engagement zone E by the urging of the wave washers.

In summary, the mechanism 10 enables power or manual operation of the door 12 without removal of the pin 26 affixing the chain 14 to the rear edge portion 22 of the door 12, or otherwise disturbing the chain 14 and the sprocket 14. Where power is available to run the motor unit 32, the lever 104 should be in the engaged position to engage the clutch 58 with the gear 48 and the sprocket 54. As such, the keys 60 are positioned in the engagement zone E for coupling the sprocket 54 and the gear 48 for rotation on the shaft 50. As controlled by the control unit 28, the motor unit 32 may drive the shaft 50 to rotate in one of two directions, rotating the gear 48 and the sprocket 54 to move the chain 14 for opening or closing the door 12.

If power becomes unavailable, such that the door 12 must be manually opened or closed, the lever 104 may be moved to the disengaged position to disengage the clutch 58 and uncouple the sprocket 54 and the gear 48. With the keys 60 withdrawn from the engagement zone E, the sprocket 54 may freely rotate, as necessary for opening or closing the door 12. When power is again available, the lever 104 may be returned to the engaged position, to couple the sprocket 54 and the gear 48. As mentioned, a slight adjustment between the sprocket 54 and the gear 48 may be necessary for aligning the keyways 70 and the teeth spaces S.

Figure 6:
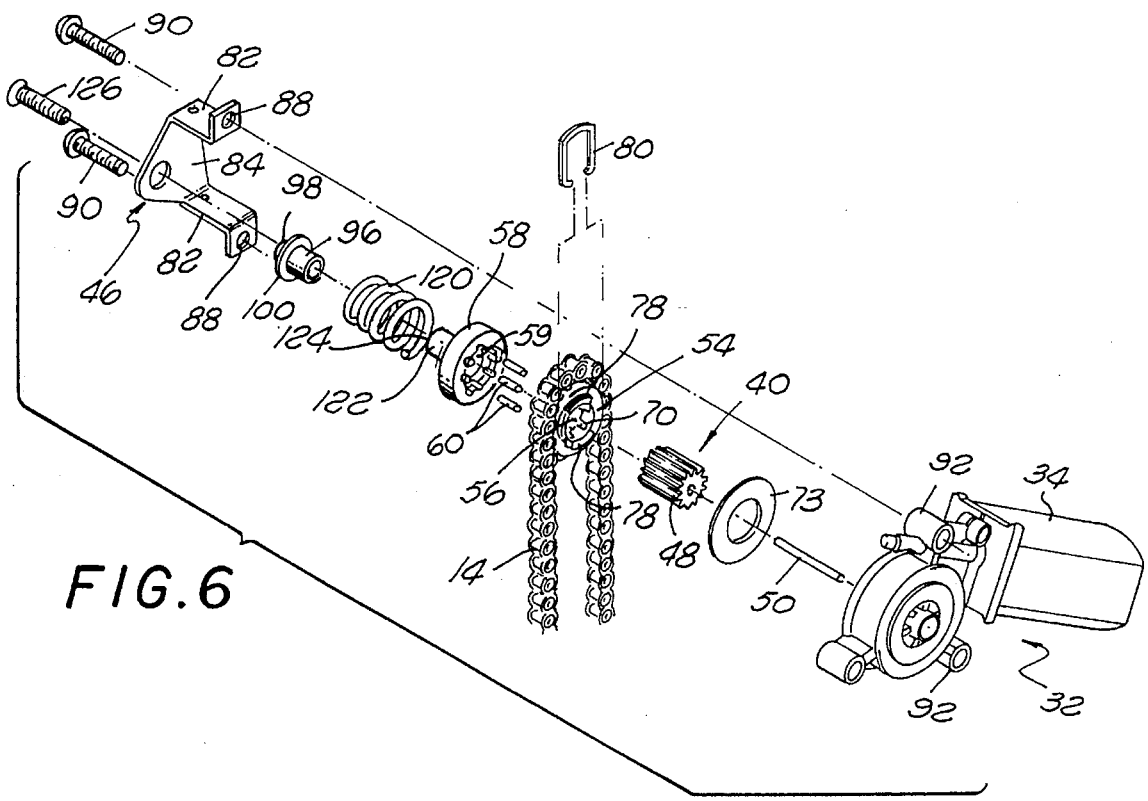
FIG. 6 is an exploded view of another embodiment of the invention.
Figure 7:
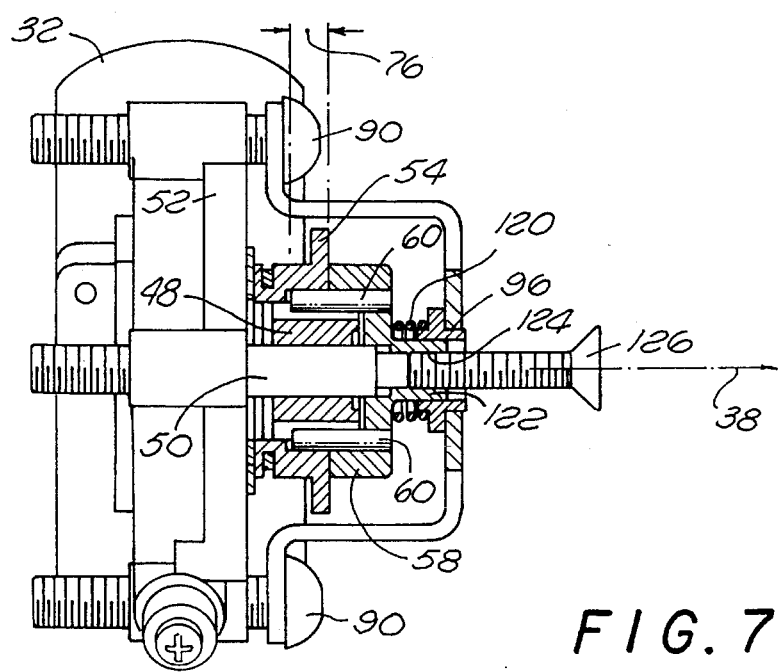
FIG. 7 is a cross section of the embodiment of the invention of FIG. 6.

FIGS. 6 and 7 illustrate another embodiment of the present invention, where like elements are referenced with similar numerals. In this embodiment, the clutch 58 provides a sleeve portion 122 extending axially toward bracket member 48. Again, the sprocket 54 and the gear 48 are positioned to provide the interfacing surface 66 and profile 72, and/or the coplanar portions 68 and 74 (see FIG. 7 at numeral 76), defining the engagement zone E (FIG. 4) with the width 76 extending parallel with the axis 38. Likewise, the clutch 58 is urged toward the sprocket 54 and gear 48 such that the keys 60 are positioned in the engagement zone E for coupling the sprocket 54 and gear 48 for joint rotation on the shaft 50. However, the sleeve bearing 96 is inserted through a helical spring 120 and then mounted on the projected sleeve portion 122 of the clutch 58. As such, the shaft 50 extends through the sprocket 54 and partially through the clutch member 58 (see FIG. 7). An inner surface 124 of the sleeve portion 122 is threaded to receive an adjustable fastener, such as a screw 126 axially aligned and inserted through the bore 86 of the bracket member 46. The screw 126 may be turned to move the sleeve bearing 96 toward the motor unit 32, urging the spring 120 to engage the clutch 58, inserting the keys 60 into the gear 48 and the sprocket 54. Likewise, the screw 126 may be turned to diengaged the clutch 58, withdrawing the keys 60 from the gear 48 and the sprocket 54.

It may be seen that the system of the present invention may be readily incorporated in various embodiments to provide a releasable drive mechanism. The various members and dimensions disclosed herein are merely exemplary, and of course, various alternative techniques may be employed departing from those disclosed and suggested herein. For example, the cooperating members may be variously configured so long as they each provide an interfacing surface or profile, or a coplanar portion, for defining the engagement zone. Also, the cooperating members and the coupling member may be variously configured so long as the keys are movable relative to at least one of the cooperating members. Other driving members as well as driven members may also be provided. Moreover, the keyways and teeth spaces maybe variously configured to facilitate engagement of the keys.

Consequently, it is to be understood that the scope hereof should be determined in accordance with the claims as set forth below.

What is claimed is:

1. A power-driven sliding door assembly for a vehicle, comprising:

a door;

a chain connected to said door;

a motor assembly for driving said chain to move said door, said motor assembly comprising a motor and a shaft rotated about its axis by said motor;

a coupling mechanism releasably coupling a segment of said chain to said motor assembly, said mechanism comprising:

a gear secured for rotation with said shaft and configured to provide a first portion extending along said shaft axis;

a sprocket mounted on said gear and configured to provide a second portion overlapping said first portion of said gear along said shaft axis to define an engagement zone, said sprocket configured to provide a plurality of keyways, said segment of said chain being wound on said sprocket;

a clutch adapted to releasably couple said chain segment to said motor assembly, said clutch having a plurality of keys positionable in said engagement zone;

wherein said gear provides spaces defined between teeth, said spaces adapted to be aligned with said keyways of said sprocket and being of a plurality for enabling fine alignment adjustments to facilitate releasable coupling of said chain to said motor assembly at said chain segment.

2. A power-driven sliding door assembly in accordance with claim 1, further comprising a lever to move said clutch for releasably coupling said gear and said chain.

3. A power-driven sliding door assembly in accordance with claim 2, wherein said lever moves said clutch along said axis relative to either said sprocket or said gear.

4. A power-driven sliding door assembly in accordance with claim 1, further comprising means for biasing said keys toward said keyways and said spaces.

5. A power-driven sliding door assembly in accordance with claim 1, further comprising means for biasing said clutch to releasably couple said gear and said chain.

6. A power-driven sliding door assembly in accordance with claim 4, wherein said means for biasing includes a spring washer.

7. A power-driven sliding door assembly in accordance with claim 1, further comprising a screw member for moving said clutch.

8. A power-driven sliding door assembly in accordance with claim 1, wherein said releasable drive mechanism further comprises a fastener securing said sprocket to said shaft.

9. A power-driven sliding door assembly in accordance with claim 1, further comprising a bracket member to maintain alignment between said gear, said sprocket and said clutch.

* * * * *